US009992142B2

(12) United States Patent
Yin et al.

(10) Patent No.: US 9,992,142 B2
(45) Date of Patent: Jun. 5, 2018

(54) MESSAGES FROM ABSENT PARTICIPANTS IN ONLINE CONFERENCING

(71) Applicant: Cisco Technology, Inc., San Jose, CA (US)

(72) Inventors: Huahua Yin, Jiangsu (CN); Mei Cui, Jiangsu (CN); Hua Tang, Jiangsu (CN); Lijuan Wang, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 579 days.

(21) Appl. No.: 14/537,227

(22) Filed: Nov. 10, 2014

(65) Prior Publication Data
US 2016/0134570 A1    May 12, 2016

(51) Int. Cl.
| | |
|---|---|
| *G06F 15/16* | (2006.01) |
| *H04L 12/58* | (2006.01) |
| *H04L 29/06* | (2006.01) |
| *H04L 12/18* | (2006.01) |
| *H04M 3/56* | (2006.01) |

(52) U.S. Cl.
CPC ........ *H04L 51/046* (2013.01); *H04L 12/1822* (2013.01); *H04L 65/403* (2013.01); *H04L 51/02* (2013.01); *H04M 3/565* (2013.01); *H04M 2201/38* (2013.01)

(58) Field of Classification Search
CPC .......... G06Q 10/063114; H04L 65/403; H04L 12/1818
USPC ................................................. 709/204–205
See application file for complete search history.

(56) References Cited

U.S. PATENT DOCUMENTS

| | | | | |
|---|---|---|---|---|
| 7,225,257 | B2 * | 5/2007 | Aoike | G08B 3/1083 709/203 |
| 8,437,461 | B1 * | 5/2013 | Gartner | H04M 3/565 379/158 |
| 8,640,257 | B1 * | 1/2014 | Sherrets | G06F 21/6245 707/732 |
| 2005/0267975 | A1 * | 12/2005 | Qureshi | H04L 51/04 709/229 |
| 2006/0153156 | A1 * | 7/2006 | Wentink | H04W 8/22 370/338 |
| 2009/0018887 | A1 * | 1/2009 | Bank | G06Q 10/06311 705/7.13 |
| 2009/0024439 | A1 * | 1/2009 | Ryan | G06Q 10/06312 705/7.19 |
| 2011/0141925 | A1 * | 6/2011 | Velenko | H04L 65/1069 370/252 |
| 2012/0130766 | A1 * | 5/2012 | Callanan | G06Q 10/1095 705/7.19 |
| 2012/0278381 | A1 | 11/2012 | Ferlitsch et al. | |

(Continued)

OTHER PUBLICATIONS

U.S. Appl. No. 14/499,291, filed Sep. 29, 2014.
We are Unified Inbox, 2014, unifiedinbox.com/about.

*Primary Examiner* — Duyen Doan

(57) ABSTRACT

In one embodiment, a method includes displaying, by a participant processor on a display device and during an online conference, a list of invited participants of the online conference. The list includes a declining one of the invited participants whom declined to participate in at least a part of the online conference. The method also includes indicating, by the participant processor on the display device and for the one of the invited participants whom declined to participate, a message having a reason for declining.

20 Claims, 12 Drawing Sheets

(56) References Cited

U.S. PATENT DOCUMENTS

| | | | | |
|---|---|---|---|---|
| 2012/0302256 A1* | 11/2012 | Pai | .......................... | H04W 4/02 |
| | | | | 455/456.2 |
| 2014/0136630 A1* | 5/2014 | Siegel | ................ | G06Q 10/1095 |
| | | | | 709/206 |
| 2014/0207577 A1* | 7/2014 | Takeda | ............... | G06Q 30/0267 |
| | | | | 705/14.64 |

\* cited by examiner

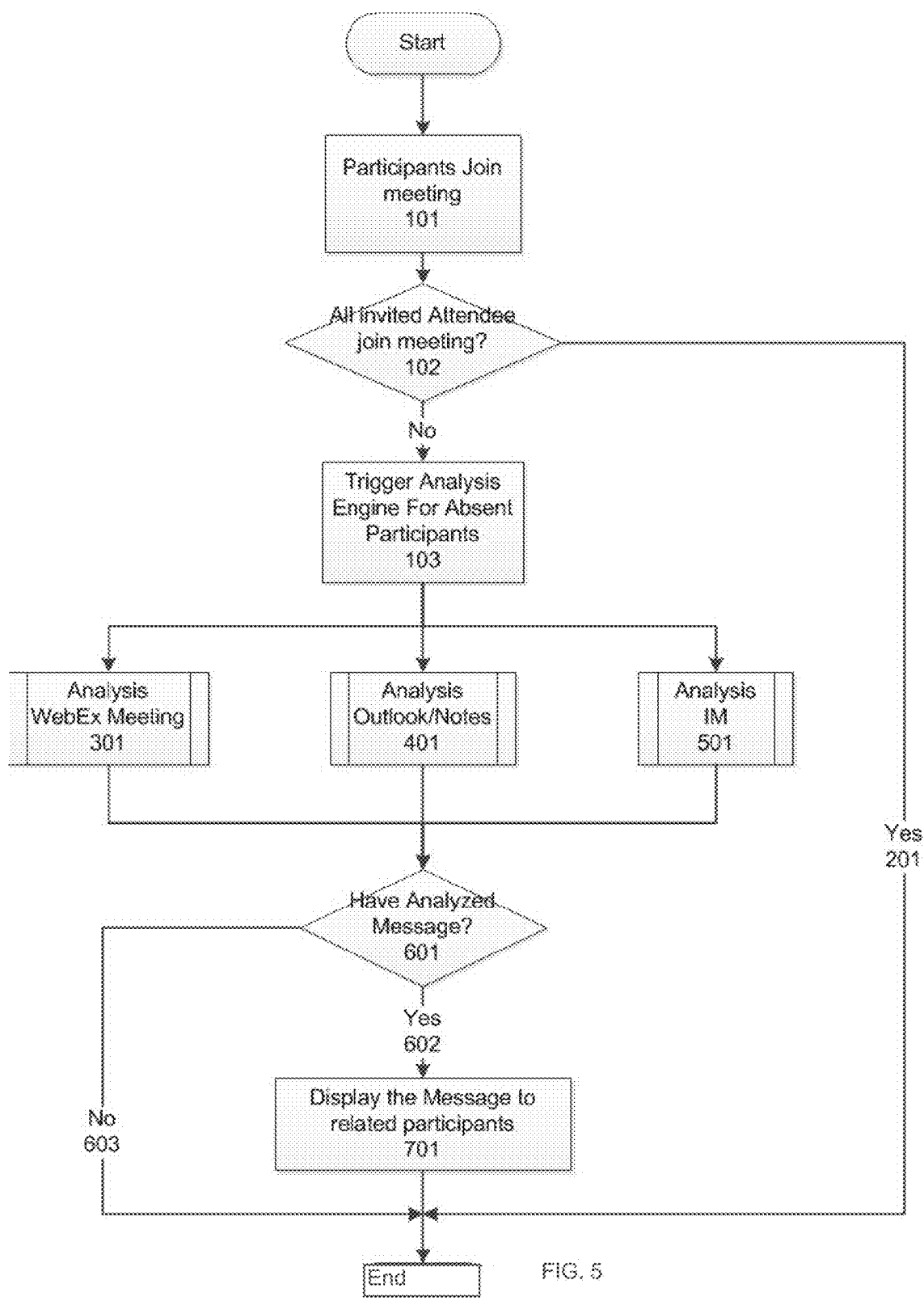

| Meeting # | Meeting topic | Sender | Receiver | Content |
|---|---|---|---|---|
| 2047533976 | Mark demo meeting | Eileen | Mark | Sorry, that I have another meeting that I cannot join the meeting. |

FIG. 7

MESSAGES FROM ABSENT PARTICIPANTS IN ONLINE CONFERENCING

TECHNICAL FIELD

This disclosure relates in general to the field of computer networks and, more particularly, to online conferencing with an improved user experience.

BACKGROUND

In real-time online conferencing, a meeting host invites participants. Some of the invited participants decline to attend with a message to the host well before the meeting. Once the online conference for that meeting begins, other participants may not be able to tell who was invited. The other participants will not know the reason given for declining. The host may or may not remember and may or may not verbally indicate the reason to other participants. This lack of information may lead to repeated requests to join and/or messages to the declining participants seeking again to obtain the reason for declining.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 5 is a flow chart diagram of one embodiment of a method for providing a message indicator during an online conference;

FIG. 7 is an example message format for use by an online conference server, host computer, or participant computer;

DESCRIPTION OF EXAMPLE EMBODIMENTS

Overview

When an invitee declines attendance of an online conference, a processor parses the content of communications provided with the reply to the invitation. Any communication may be used, such as email, instant messaging, or use of the online conference program. During the online conference, the invitees are listed. Any of the invitees that declined are listed with the parsed message or an indication of the message. Participants then have access to the list of invitees and/or the content of any messages explaining why the invitees are not participating. The extraction of the message from the invite reply or the display of the list with message information is used separately or together.

In one aspect, a method includes displaying, by a participant processor on a display device and during an online conference, a list of invited participants of the online conference. The list includes a declining one of the invited participants whom declined to participate in at least a part of the online conference. The method also includes indicating, by the participant processor on the display device and for the one of the invited participants whom declined to participate, a message having a reason for declining.

In another aspect, logic encoded in one or more non-transitory computer-readable media includes code for execution. When executed by a processor, the code is operable to perform operations including: receiving a communication that an invited participant of an online conference declines to attend; extracting a message from content of the communication; and providing the message as a reason for declining to attend.

In yet another aspect, an arrangement includes an interface configured to receive a list of invited participants in an online conference and to receive a message declining an invitation to the online conference. The arrangement also includes a processor configured to display on a display device the list of the invited participants and to display the message for one of the invited participants corresponding to the declining of the invitation. The display is part of a user interface for the online conference.

Example Embodiments

To easily know who was invited, including those invited but not joining a meeting, a user interface for the online meeting includes a message display in a meeting list. The list includes invitees not attending. To indicate the reasons for not attending, any message (e.g., text/audio) provided by the declining invitee is accessible in or from the list. Messages for absent invitees are extracted or parsed and displayed for meeting participants. The messages are extracted from WebEx meeting, mail (e.g., outlook/note), and/or instant messaging so that the reasons for not attending may be displayed to participants in the meeting. The scattered message methods are analyzed so that the declining invitees and associated reasons for not attending may be displayed to the host and/or participants during the meeting.

Figure 1:
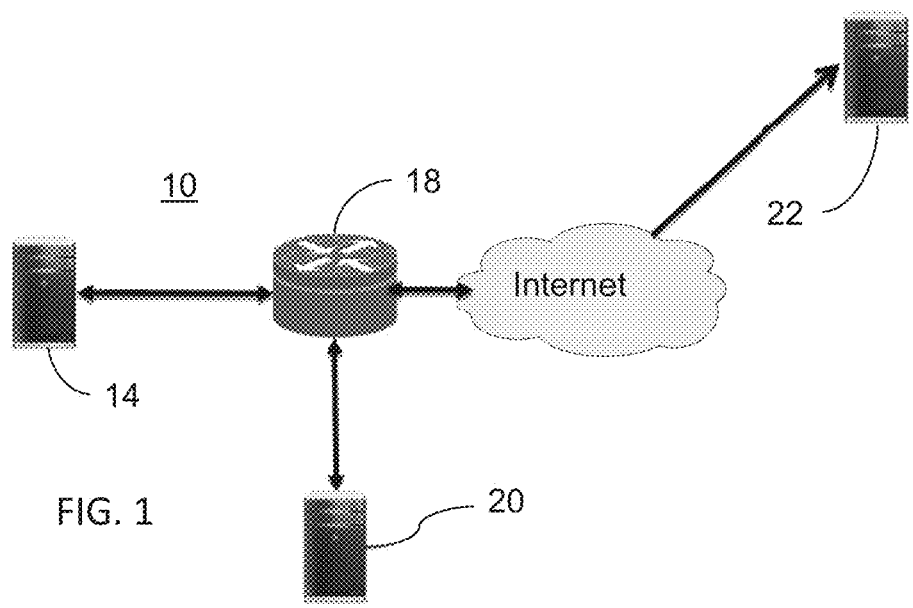
FIG. 1 is a simplified block diagram of an example network for absent participant messaging in online conferencing.

The meeting is part of an online conference. The online conference is hosted by a computer network. FIG. 1 shows an example network 10 for online conferencing. A media session between end-point devices 14, 20 and 22 or peers is created. Any number of end-point devices 14, 20, and 22 may be used, such as just two. The online conference is hosted by the network 10 for providing audio, video, and/or synthetic content between the end-point devices 14, 20, and 22. For video conferencing, the online conferencing server 18 may combine decoded inputs from different end-point devices 14 and 20 for encoding a combined video stream. For video or other online conferencing, the online conferencing server 18 may provide shared content from a presenter combined with an interaction from an attendee. In one embodiment, the network 10 supports operation of a telepresence or WebEx system from Cisco, but other online conferencing may be provided.

Additional, different, or fewer components may be provided in the network 10. For example, additional or fewer end-point devices to participate in a given media session, additional third-party servers, or different networks are provided. As another example, the online conferencing server 18 is not provided, with an end-point device 14, 20, 22 instead hosting the video conference. In other examples, the network 10 may be many different devices connected in a local area network, wide area network, intranet, virtual local area network, the Internet, or combinations of networks. Any form of network may be provided, such as transport networks, data center, or other wired or wireless network. The network 10 may be applicable across platforms, extensible, and/or adaptive to specific platform and/or technology requirements.

The network devices (e.g., end-point devices 14 and 20) of the network 10 are in a same room, building, facility or campus, such as part of a same enterprise network. In other embodiments, the network 10 is formed with devices distributed throughout a region, such as in multiple states and/or countries. The end-point devices 14, 20, 22 may be in different networks.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable, cellular, and/or other links may be used. Corresponding interfaces are provided as the ports.

The online conferencing server 18 is a server for managing or controlling the conference. The online conferencing server 18 receives any inputs, such as audio, video, and/or user inputs, from the various end-point devices 14, 20, 22, determines information to output as part of the conference from the inputs, and transmits shared content, audio, and/or video to the end-point devices 14, 20, 22. In one embodiment, the online conferencing server 18 is a decoder and an encoder for receiving encoded inputs from the end-point devices 14 and 20, decoding the inputs, assembling video (e.g., combining input videos) and encoding the assembled video for output to any or all of the end-point devices 14, 20, and/or 22. The online conferencing server 18 is an application specific integrated circuit, a computer, a conference server, or other hardware. Any now known or later developed conferencing server or host may be used.

Any number of end-point devices 14, 20, 22 may be provided. The end-point devices 14, 20, 22 are computers, conference servers, tablets, cellular phones, Wi-Fi capable devices, laptops, mainframes, voice-over-Internet phones, or other user devices participating in a media session. The end-point devices 14, 20, 22 connect with wires, such as Ethernet cables, or wirelessly, such as with Wi-Fi. The connection may be relatively fixed, such as for personal computers connected by wires to switches. The connection may be temporary, such as associated with mobile devices. The end-point devices 14, 20, 22 may include encoders and/or decoders.

The end-point devices 14, 20, 22 may include one or more user input devices. For example, a mouse and keyboard are provided. As another example, a touch screen is provided. The end-point devices 14, 20, 22 include a microphone or speaker that may act as a microphone. One or more of the end-point devices 14, 20, 22 may include a camera. A microphone and speaker allow for audio communications as part of the video or online conference. A camera and display allow for video of the presenter and/or attendees as part of the video or online conference. Video may not be provided in other embodiments, such as where content is shared and audio used, but real-time video of a presenter is not provided. The displays of the end-point devices 14, 20, 22 allow for display of shared content, such as display of the desktop or conference window of a presenter. For example, a document or application is displayed as shared content on the displays of the end-point devices 20 and 22 where the shared content is hosted or originates from the end-point device 14.

A processor, computer, server, memory, or other device creates and/or captures synthetic data at one or more end-point devices 14, 20, 22. For example, a personal computer or conference server generates a POWER POINT or other presentation using software or a program. The synthetic content may be captured in real-time. Alternatively, the synthetic content is captured only upon a trigger, such as a change in the display.

At any given time, one or more of the end-point devices 14, 20, 22 are capturing audio and/or video. Any given end-point device 14, 20, 22 may be capturing audio, outputting audio, or both at a given time. The operation may change over time, such as one end-point device 14 capturing audio while the local attendee is speaking and then outputting audio while a user local to a different end-point device 20 is speaking. Similarly, the input source at a given end-point device 14, 20, 22 may change, such as switching between camera capture and receipt of synthetic data as shared content. Any conferencing arrangement or operation may be provided.

The end-point devices 14, 20, 22 are configured to initiate or participate in a media session. The end-point devices 14, 20, 22 operate pursuant to a real-time protocol (RTP) or other communications protocol for video and/or audio communications with or without data sharing. As part of the media session, content from another source may be added or incorporated. For example, data from one or more authorized sources, such as a financial services server, search engine, drop box database, or other source, is to be included in the media session. The web content is requested pursuant to TCP/IP or other protocol. The presenter controls the shared content.

The various components of the network 10 are configured by hardware and/or software to operate for video or online conferencing. Logic is provided in one or more non-transitory computer-readable media for operating the end-point device 14, end-point device 20, end-point device 22, and/or conferencing server 18. The media is a memory. Memories within or outside the network 10 may be used. The logic includes code for execution by a processor or processors, such as processors of the end-point devices 14, 20, 22 or conferencing server 18. When executed by a processor, the code is used to perform operations for allowing and presenting attendee interaction with shared content.

Figure 2:
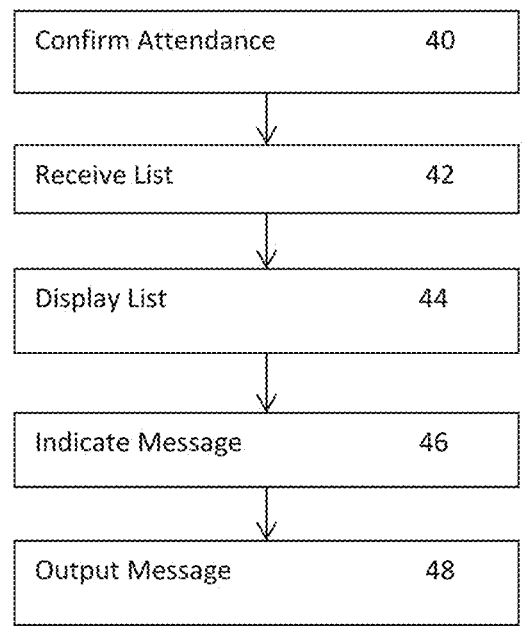
FIG. 2 is a flow chart diagram of one embodiment of a method for display of declining messages in online conferencing.

FIG. 2 shows a method for invitee list display and/or indication of decline messaging in online conferencing. The online conferencing includes shared content, audio, and/or video. Video of the presenter and/or attendee may or may not be provided. In one embodiment, the online conference is a WebEx conference. In another embodiment, the online conference is a telepresence conference. Other online conferencing applications or programs may be used.

The acts of FIG. 2 are performed by one or more processors, such as a computer or computers of a given online conference attendee. The processors for other attendees may perform the same or different acts. Other processors may perform one or more acts, such as acts associated with extracting messages or providing lists of invitees. The conferencing server and/or host computer may perform the same acts, a sub-set of the acts, or none of the acts.

Various acts 40-48 are shown in FIG. 2. Additional, different, or fewer acts may be performed. For example, acts 40 and/or 42 are not performed, such as where the method provides display of a user interface without the process of accepting an invitation. As another example, act 48 is not performed where one of the indications of availability of a message from an absent invitee is not activated. In yet another example, messaging and/or other acts for online conferencing are performed in addition to the acts shown, such as acts for the presenter to provide the shared content in the first place and acts for determining which audio to transmit to the attendees and presenter.

The acts are performed in the order shown, as represented vertically with the first acts occurring at the top of FIG. 2 and as represented by the arrows. In other embodiments, other orders are provided, such as outputting the message in act 48 prior to indicating the existence of the message in act 46. Act 48 may be repeated without repeating acts 44 and 46 (e.g., acts 44 and 46 provide persistent displays with or without updating).

In act 40, the attendance by an invitee is confirmed. A computer associated with the invitee receives an invite for an online conference. The invite is communicated in one or more of various ways. For example, an email or instant message with a link or meeting identification is provided. The meeting identification or link may be communicated verbally and input to the computer. Online conference software may allow for communicating the invitation to the invitees.

In the context of FIG. 2, a computer of an attendee is performing the acts. Accordingly, this computer or another computer of the attendee accepts the invitation to the online conference. In response to user input (e.g., touchscreen, mouse, keyboard) with a user interface (e.g., email, instant messaging, meeting program), the invitation is accepted. In other embodiments or for other invitees, the invitation is not accepted. The invitee uses their computer to join the meeting without prior acceptance of the invite.

The acceptance is sent by the invitee computer to the host computer. Alternatively or additionally, the acceptance is sent to an online conference server. The server may pass the acceptance to the host. The acceptance uses the same or a different type of communications as the invite, such as email, instant messaging, or a conference specific application or plugin.

If the invitee were to decline, the reply to the invite is provided to the host computer and/or conference server. The reply may be based on selection of a decline or other option. The reply may further provide for entry of text or audio with a statement or statements about why the invite is being declining and/or relevant to the online conference.

The conference server and/or host computer gather a list of invitees that have accepted and declined. Separate lists for accept and decline or the same list with flags may be used. Some of the invitees may fail to respond to the invitation. In one alternative, a list of declining invitees is kept. Once the online conference occurs, the lists may be updated or altered based on actual attendance.

In act 42, the attendee computer receives the list of invitees. Where the attendee was an invitee, the attendee is included in the list during the conference. Alternatively, a list of invitees that declined and/or are not connected is received. The list is received upon connecting to the online conference, but may be received prior to connecting to the online conference.

The list is received from the online conference server. The online conference server tracks acceptance and declines. Actual attendance during the conference may be used. Alternatively, the host computer communicates the list to the online conference server, and the online conference server then passes the list to one or more (e.g., all) of the attendees including or not including the host.

Other information may be provided by the online conference server, such as message information. Whether a message exists, the type of message, and/or the message itself is provided with the list or separately from the list. The attendee computer receives the message information. In one embodiment, the message information is received for formatting by the attendee computer. In other embodiments, the message information is received as formatted content (e.g., html web page with the list and at least some of the message information in a specific display arrangement).

In act 44, the list is displayed by the attendee computer. The list displayed is the list received from the online conference server or a list compiled from information received. For example, the online conference server may communicate a list of current attendees for a conference. Any invitees not on the list of attendees are added. The list displayed is of invitees, not just participating invitees. The list may include one or more invitees that declined or are not present. In alternative embodiments, the list being displayed only includes invitees that are not present, only invitees that declined attendance in a communication, or only invitees for which a relevant message exists.

Figure 3:
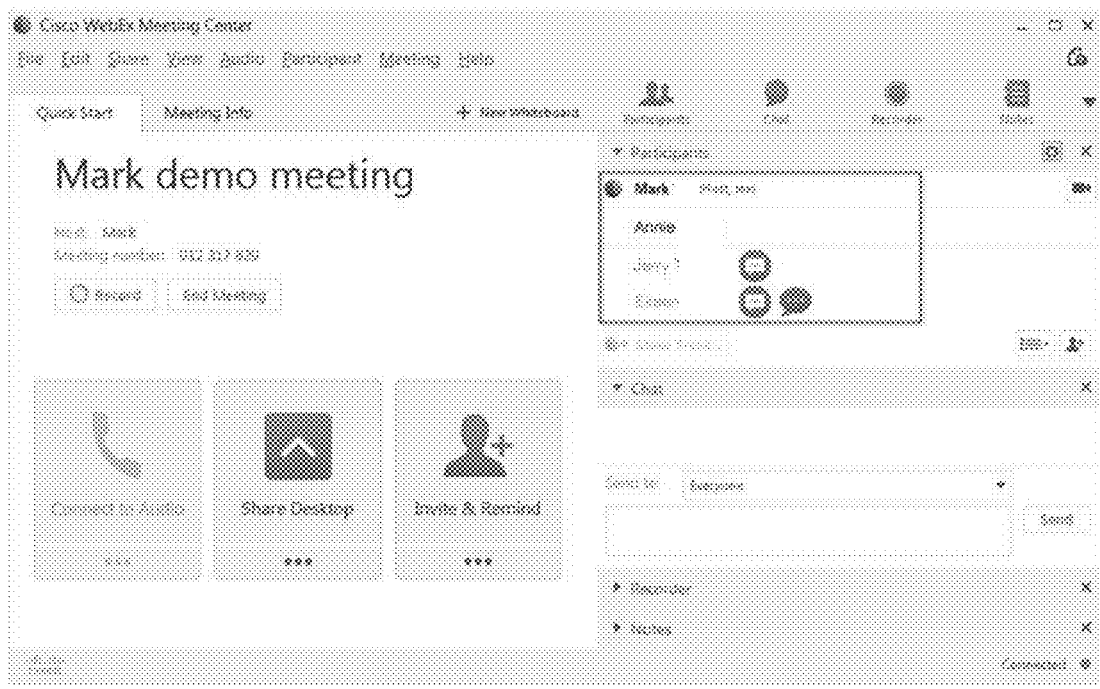
FIG. 3 is an example online conference display of a list of invitees and indications of any declining messages.

The processor of the participant computer displays the list. The list is displayed in the user interface of the online conference. For example, FIG. 3 shows an online conference user interface with a participant list. Two participants are shown as active and two participants (Jerry and Eileen) are shown as not connected or having not joined the meeting. The processor causes the list to be displayed on a displace device. In other embodiments, the list is shown in a separate window, tab, drop down, or outside of the online conference user interface.

The list is shown during the online conference. Once the conference is active, the list as currently existing is shown to any participants. As participants join and/or drop out, the list may be updated or remain the same. In alternative embodiments, the list is provided prior to and/or after the online conference. For example, the host or other attendee may desire to see the list of invitees and any message indicators at times other than during the online conference.

The list is a list of names. Other information may be used instead of or in addition to names. For example, employee numbers, location information, telephone number, contact information, pictures, or other information is provided.

The list includes one or more of the invitees that declined and/or did not connect to the online conference. For example, Jerry and Eileen in FIG. 3 both declined to participate prior to the online conference. Once the online conference begins, Jerry and Eileen are listed. Where the invitee declined for only part of the online conference, then the invitee is included in the list of decliners or non-participants only during the part in which they are not participating or connected to the online conference.

Different types of invitees may be displayed differently. For example, the list includes all invitees. The non-participating and/or declining invitees are displayed differently. Any distinction may be used. In the example of FIG. 3, the declining invitees are displayed as greyed out or a different color than the participants. Highlighting, flashing, arrows, notation, or other distinction may be used. In other embodiments, the invitees are listed by category. For example, different boxes labeled by the type of invitee (participant, decline, tentative, accepted but not connected, and/or other type) separately list the relevant invitees. Together, these lists provide a list of all or a sub-set of the invitees. One or more of the invitees may be a declining one distinguished from invited or other participants.

If the status of an invitee changes during the meeting, then the distinction or group membership indication changes. For example in FIG. 3, Jerry or Eileen join despite declining or join after missing a part of the meeting for which they declined. Once joined, their names switch lists, such as showing Jerry's name in black instead of gray once Jerry joins. The lists are dynamic and may vary during the meeting. Similarly, as replies to the invitation arrive, the list prior to the online conference may vary.

Referring again to FIG. 2, a message having a reason for declining is indicated in act 46. The participant processor indicates the existence of the message on the display device. The indication is that the message exists and/or the message itself.

The indication is for the invitee or invitees whom declined to participate. The decline may be through indication of possible attendance (e.g., decline if or tentative). The decline may be for all or part of the meeting (e.g., decline for part A, but accept for part B). The indication is provided when appropriate, such as when the invitee is not connected to the conference. If connected, then the indication is no longer provided. Indicating the message ceases when the declining one of the invited participants joins the online conference.

The declining invitee may leave a message for other attendees and/or the host in declining. As a result, the message may be available for viewing by the participants and/or host. Any invitee that does not join, but did not decline in any way may not have such a message, so an indication of the message is not provided. In other embodiments, any message from a non-attending invitee may be indicated, regardless of whether the message is from a reply to the invite. Thus, messages may be indicated even for a participant and/or even for an invitee that did not respond specifically to the invite.

The indication is a highlight, marker, icon, flashing, drop down in response to hovering over the name on the list, or other indication that the message exists. In the example of FIG. 3, the indication is a message icon. Different message icons may be provided for different types of messages, such as one for audio and one for text. In the example of FIG. 3, a message icon from email text is provided for both Jerry and Eileen. A message icon for instant messaging text is provided for Eileen. More than one indication may be provided for a given declining invitee.

The indication is displayed adjacent to the name or identifier on the list. For example, the indicator is in a same row as the name (see FIG. 3). In other examples, the name itself (e.g., color of the name) or the message itself is the indicator.

Due to privacy concerns, use of the indicator and/or inclusion on the list of declining invitees may be limited. For example, the indicator may be displayed only for the host or for a sub-set of participants. As another example, the indicator may not be displayed at all for one or more declining invitees.

Confirmation of permission to indicate the message may be used. In one example, a pop-up window or text in the invite indicates that the reply to the invite may be displayed to the participants. The invitee is provided with an option to prevent display of the content of the reply. In another example, the invitee and/or host configures the online conference program to allow or not allow such display. When the invitee replies to an invite, the configuration is used to flag whether or not the reply to the invite may be used for display of the message. The list of invitees may be used to restrict the message indication to specific participants, such as just the host. Rather than using configuration at the time of reply, the confirmation may be performed during the online conference. The online conference program or server checks the configuration for privacy set by each declining invitee to limit or not indication of the message.

Figure 4:
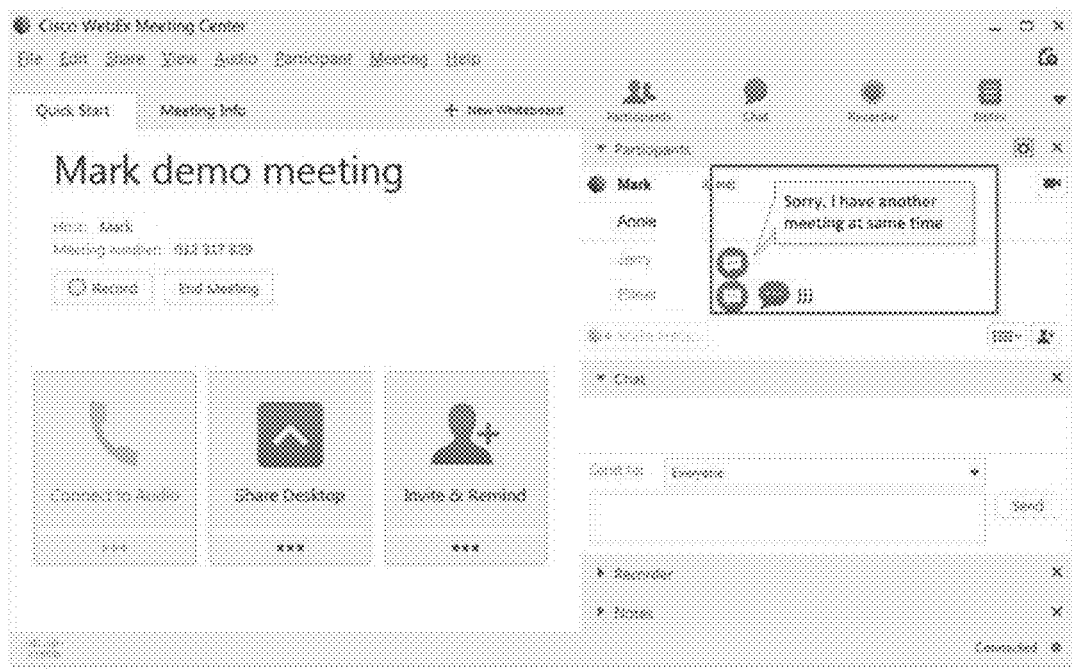
FIG. 4 is an example display of a declining message provided during an online conference.

In act 48, the message is output. Using an input (e.g., touchscreen or mouse), the participant selects the indication. Any selection may be used, such as positioning the cursor with or without clicking. In response to the selection of the indicator, the message is output. FIG. 4 shows selection of the email message indicator for Jerry from the list shown in FIG. 3. In response to the selection, the message is output.

The message is text, audio, or video. In the example of FIG. 4, the message is text parsed from or extracted from an email. Rather than just showing the body of the email, the email itself may instead be shown (e.g., include subject line, to, from, signature line or other information). In other examples, selecting the indicator results in playing an audio recording from the non-attending invitee. The message, whether text, audio, or video, is from the non-attending invitee. The message is a reply to the invite.

Any format may be used. In the example of FIG. 4, a pop-up bubble shows the message. A different window, scrolling text in the list or elsewhere, or other format for display of the message may be used.

The message is from a reply to the invitation for the meeting. For example, the message is parsed from an email, instant message, or entry for a productivity tool of the online conference. The parsing may select the entire reply or part of the reply, such as a body of the reply. Further limitations may be used, such as parsing only content containing key words in the sentence or paragraph (e.g., "sorry," "cannot," "unable" . . . ).

Since the message is from the non-attending invitee and in reply to the invite, the message is likely to contain information about why the invitee is not attending. In the example of FIG. 4, the message "sorry, I have another meeting at the same time" is displayed as the output. The participant, by selecting the indication, may be able to determine why other invitees are not attending.

FIG. 5 shows one embodiment of how to provide the messages and display in a meeting. The method is directed to presenting the message during an online conference. In act 101, when a meeting is started, participants join the meeting. RTP channels are created from the participant computers to the conference server. In act 102, user status is detected. Before (e.g., 3 minutes), at start time, or later, the conference server determines the status (connected or not) of the invited participants. The status check is repeated periodically or in response to any change in status by an invitee. The time at which the checks begin may be a default or user configured time by the host. In act 201, if all or particular ones of the invited participants are in the meeting, then the meeting starts.

If some of the invitees are not joined, the host computer or the conference server triggers an analysis engine or code to analyze the absent invitee or invitees in act 103. The analysis engine or code locates meeting messages. The message are previously derived from the conferencing program itself, email, instant message, or other types of communication. Participant computers, the host computer, of the server memory may be queried or searched to locate messages for absent invitees.

In acts 301, 401, and 501, messages associated with different types of communication are analyzed. Additional, different, or fewer types of communication may be analyzed. The analysis may occur at the time of triggering or during the meeting, such as analyzing saved communications. Alternatively, the analysis occurs as the replies to the invites are received by the host computer or the conference server. The analysis of acts 301, 401, and 501 in FIG. 5 is then a gathering of the previously parsed information.

In act 301, one or more messages associated with meeting application (e.g., WebEx) are analyzed. In act 401, one or more messages from an email or mail program (e.g., Outlook or Notes) are analyzed. In act 501, one or more messages from an instant messaging program are analyzed. The analysis is to extract a reason for not attending or declining the invitation. The body of any reply to an invitation may be assumed to include the reason, so the body is extracted. In other approaches, word searching or other techniques are used to find specific sentences or audio about the reason for declining.

In act 601, a determination is made by the host computer or the conference server about whether the analysis located a message. In act 602, the message is sent to the meeting client of the participant computers. The participant computers then have the message for display when activated by the participant. Alternatively, the message is maintained by the server until requested by the client. If no messages are detected, the absent invitees may not have left a message in the reply or did not reply. In act 603, the lack of message results in ending the process. In act 701, the meeting client on the participant computer displays the message or an indicator of the existence of the message.

Figure 6:
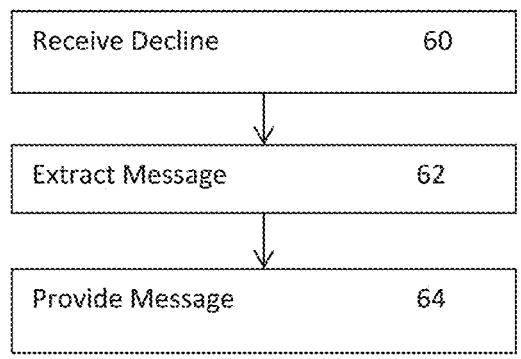
FIG. 6 is a flow chart diagram of one embodiment of a method for extracting a message from a communication declining an invitation.

FIG. 6 shows one embodiment of a method for performing the analysis to extract messages. The method is generic to the type of communication (e.g., email, instant message, conference application). A generic format, such as shown in FIG. 7, may be used regardless of the type of communication to communicate the message for display by the participant computers. FIGS. 8-12 show examples of extracting from specific types of communications.

With respect to FIG. 6, additional, different, or fewer acts may be provided. The acts are performed in the order shown or other orders.

The invitee computer, conference server, or host computer perform acts 60-64. For example, a meeting client on the invitee computer identifies a reply to an invite and performs the acts. As another example, the conference server and/or host computer receives the reply and performs the acts.

In act 60, a communication is received. Any type of communication may be received, such as email, instant messaging, meeting application-based communications, or others. The communication is received at the conference server or the host. Alternatively, the communication is received at an invitee computer, such as the invite creating and entering the communication.

The communication is in response to an invitation. A reply declining the invitation is received. The communication is of a same or different type than the invitation. For example, an email, instant message, or meeting application message is received by the computer of the invitee. The invitee replies using the same or different type of communication. In one embodiment, the reply is through plugin or meeting application. A specific set of selectable options, such as selecting to accept, decline, or tentative, are provided. The invitee has the option of inputting further information, such as text or audio. In other embodiments, the reply is instead more free form or not part of a configuration guided by a plugin for the conferencing application or the meeting client. For example, the invitee uses a reply function of the instant messaging or email without the client configured selection options.

In one embodiment, the invitation and resulting reply are flagged. Using the meeting application or plugin, communications specific to invites are flagged as such. The resulting reply is similarly flagged. This flagging or other marking may be used by the conferencing server or host computer for organizing the online conference. The received communication is flagged, so the server or host computer may associate a given communication with the invitation and corresponding meeting. Rather than or in addition to flagging, the communication addressing or routing may be forced to be through the conferencing server or to the host computer. In alternative embodiments, the communication or related communication are searched for meeting related information rather than using a flag. For example, a link or meeting ID is located in the communication or communication string, so the received communication is treated as related to the meeting invitation. Other approaches for identifying a communication as related to or a response to an invitation may be used.

In act 62, a message is extracted from the content of the communication. The conference server or host computer extracts the message, but the invitee computer may extract the message instead.

Where the reply is without further content, there is no message to be extracted. Where the reply includes text or audio in addition to the mere indication of plan to attend or not, the reply includes content in the communication. The body of the communication has text or audio added by the invitee in replying to the invitation.

The content or invitee added text or audio is extracted from the communication. Any parsing may be used. For example, the format of the communication is known, so the data for the body or added information is extracted based on format. In one embodiment, the body of a reply email is extracted as the message. The parsing may remove non-greeting and non-signature body, such as identifying sentences of four or more words or identifying text between a greeting and signature. In another embodiment, an instant message that is a reply to the invitation is parsed. The text entered to reply is selected for the parsing. In yet another embodiment, audio or text entered by the invitee into the meeting client or plugin user interface is received and extracted as the message. FIGS. 8-12 show some further examples.

In act 64, a message is provided as a reason for declining to attend. The extracted content is provided to the conference server and/or the participants before or during the meeting. The extracted content is the message.

For communicating the message, the message is formatted. FIG. 7 shows an example message format. The format includes the meeting identifier, the title or topic of the meeting, the host, the invitee, and the content of the message. In this example, the content or message is text. In other examples, the content is audio. Other formats may be used, such as not including the topic and/or host. The format associates the message with a particular invitee for a particular meeting.

As discussed above for FIG. 2, the message is provided to the host or other participant computers. The online conference meeting clients add an indication on the participant display based on the received message. The message may be added. The meeting client displays a list of invited attendees, including any declining attendees, just a list of not present invitees, or just a list of declining invitees. An icon or the message itself is included in the list so that the reason for declining may be viewed.

Figure 8:
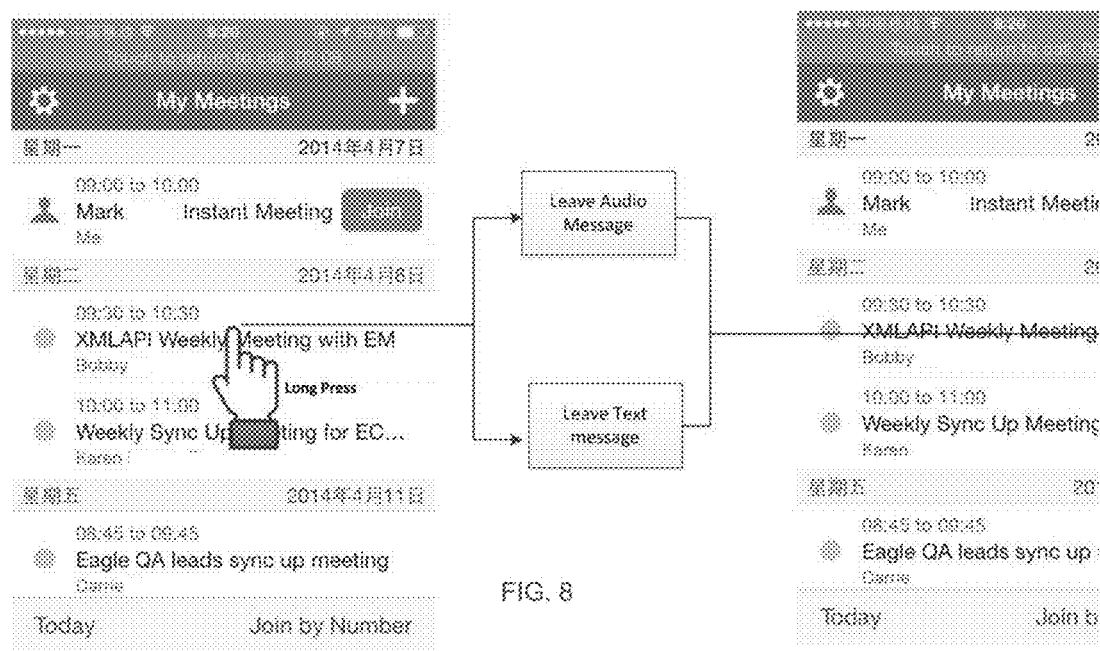
FIG. 8 shows an example process for inputting a decline message in a meeting application.

FIG. 8 shows an example of extracting a message using a built-in communication of the meeting application, such as the analysis of act 301 of FIG. 5. In this example of FIG. 8, the meeting application provides a user interface on a mobile device, such as a phone or tablet. In other embodiments, the user interface is provided on a personal computer. The user interface includes an invitation in a list of meetings. The invitee selects the meeting to reply to the invitation. For example, the user touches or touches and maintains contact with the meeting listed on a touch screen.

In response to selection of the invitation, options for declining, accepting, or tentative may be provided. If declining, the invitee computer provides the invitee with one or more message input options. For example, the invitee may leave an audio message or a text message. After the message is input, the message is associated to this meeting so that during the meeting, the meeting host and/or participants may see the message.

Figure 9:
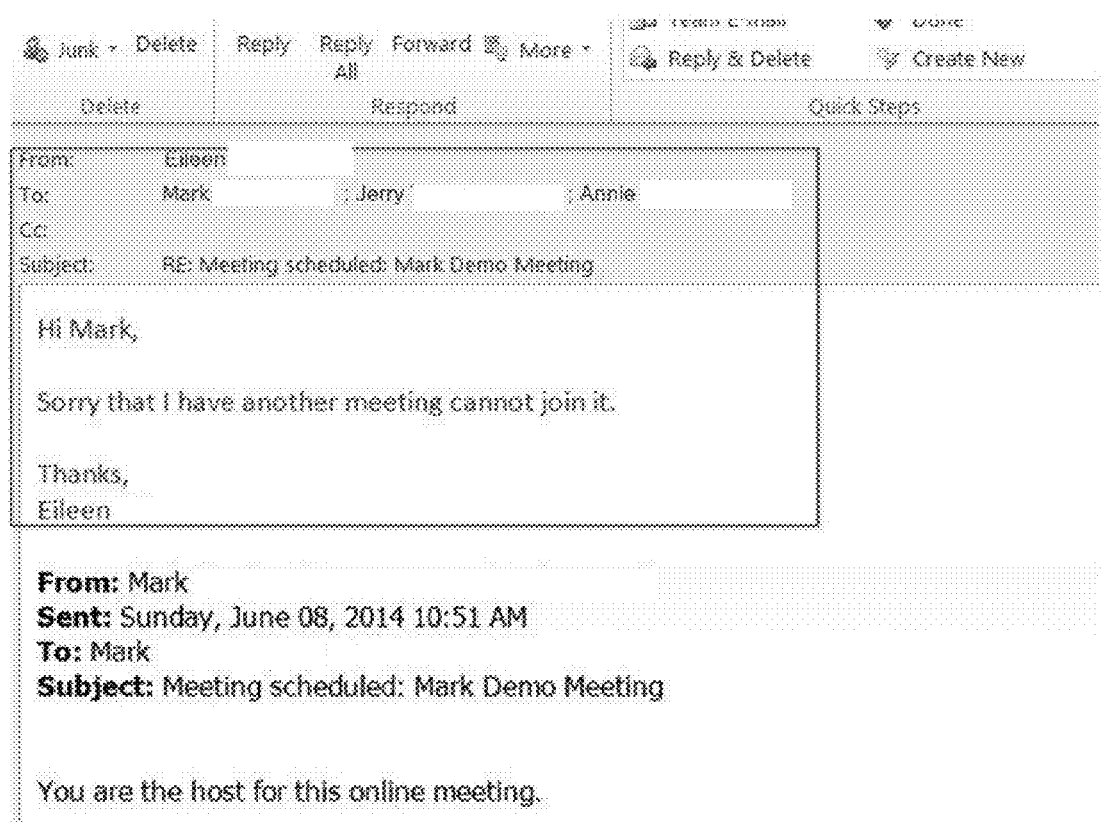
FIG. 9 is an example email chain of a response to an invitation for a meeting.
Figure 10:
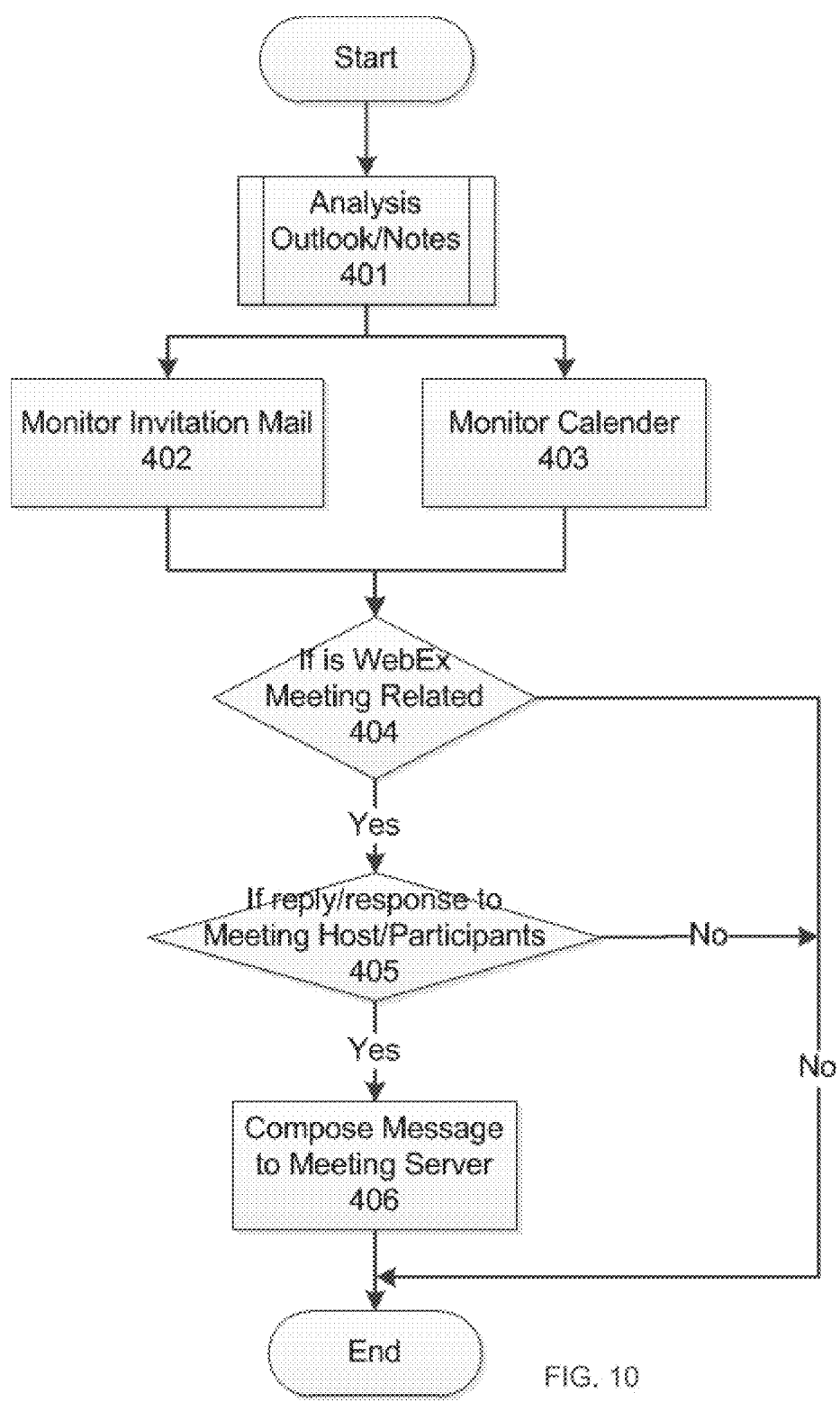
FIG. 10 is a flow chart diagram of one embodiment of a method for extracting a message from email.

FIGS. 9 and 10 show analysis of an email to extract the message, such as analysis for act 401 of FIG. 5. FIG. 9 shows an example email chain. Mark invited Eileen to a meeting via email. The email is associated with the meeting, such as being generated by a meeting plugin operating with email. Eileen responds to the invitation, so the response is flagged as being for the meeting. Rather than being an email chain, the plugin may allow for interaction with the calendar function. The analysis engine as part of a productivity tool of the meeting application or plugin extracts the message from the reply. Using word searching, format template, or other parsing, the text between the greeting and signature line is parsed. The emails sent to the host or other invitees are analyzed to extract the message.

FIG. 10 shows one example flow chart for operation of the plugin on the conference server or host computer. In act 401, the analysis process begins. The plugin for the invitee's mail program on the invitee's computer monitors the mail and calendar functions in acts 402 and 403. The monitoring may instead be performed by the host computer or conference server. This monitoring is always on or triggers in response to any new entry. In this way, each communication is monitored for being a reply to an invitation. In act 404, if the communication is not related to the meeting, the process ends. If related, the communication is checked in act 405 for whether the communication is a reply or response to a meeting host or other participants. For example, the communication is checked for being a reply to an invitation. If not, then the process ends. If a reply, then the message is parsed in act 406 and formatted for providing to or from the meeting server.

Figure 11:
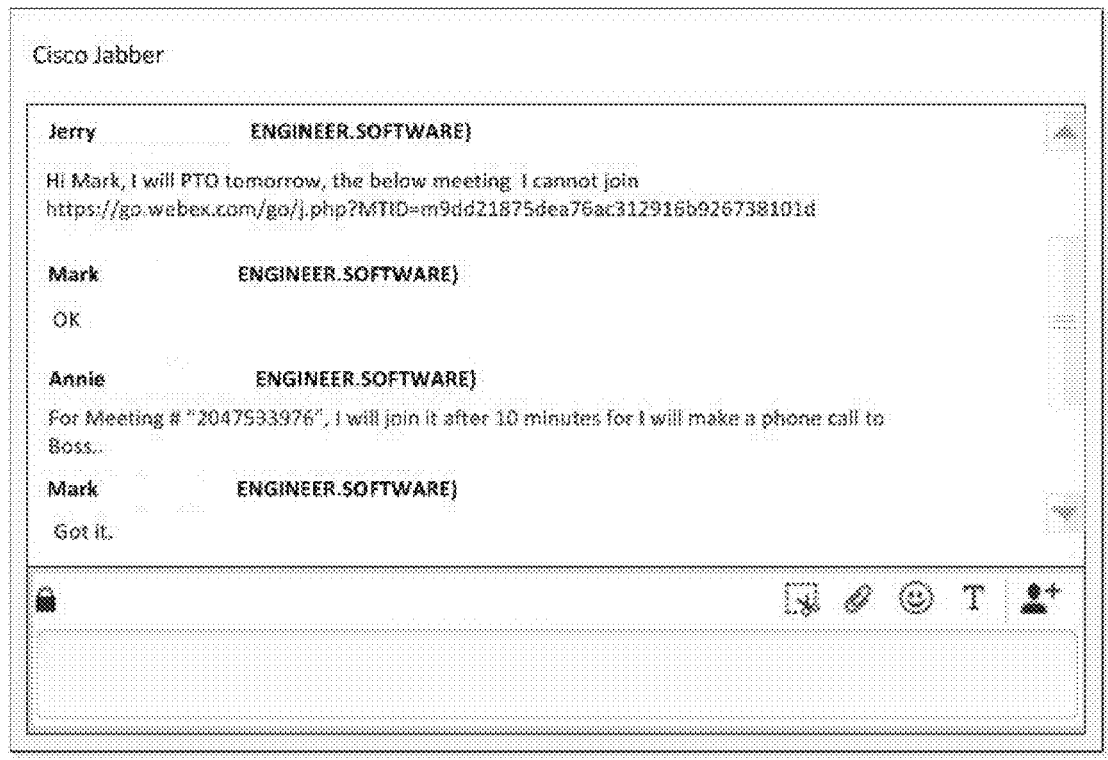
FIG. 11 is an example instant message conversation of a response to an invitation for a meeting.
Figure 12:
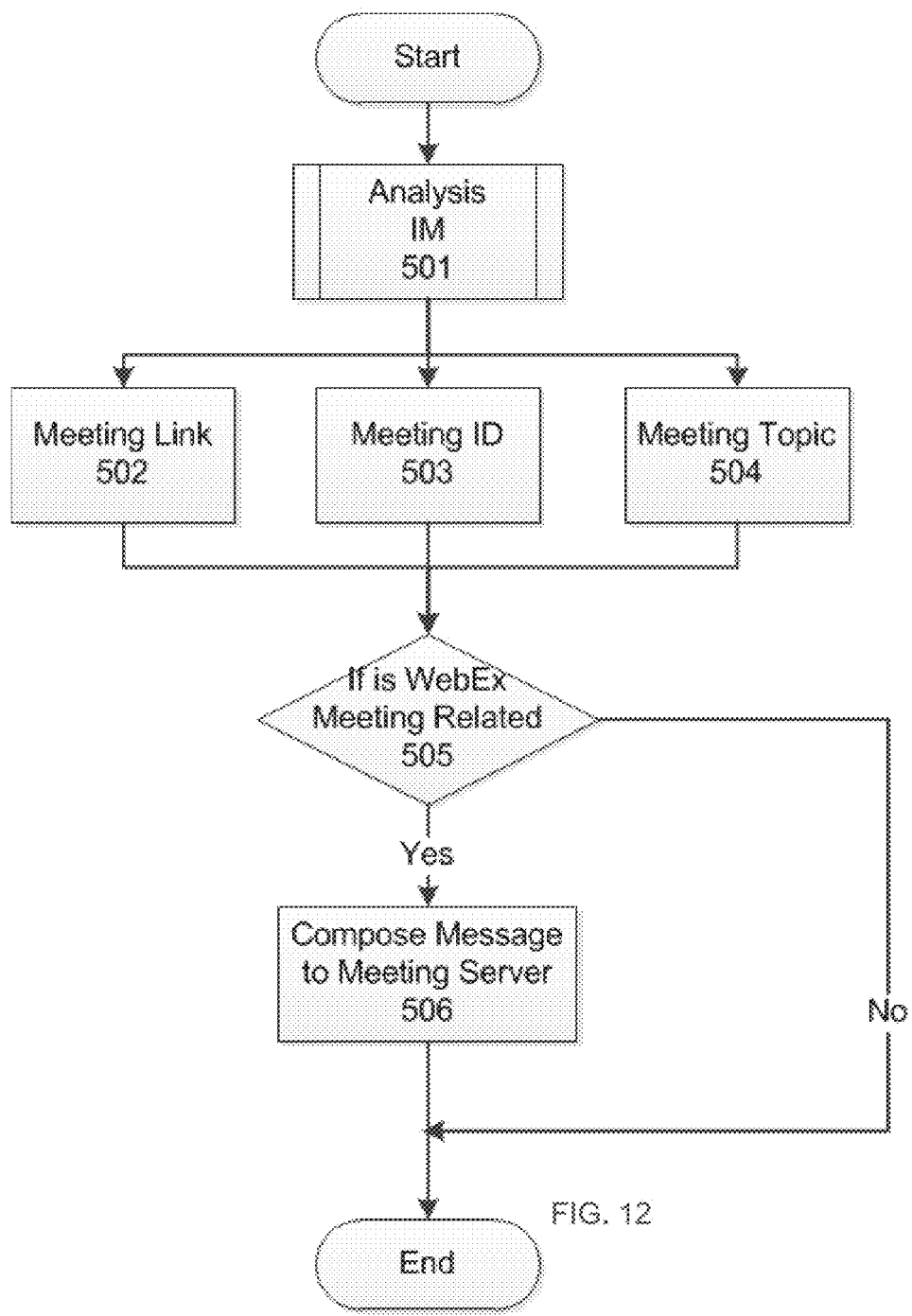
FIG. 12 is a flow chart diagram of one embodiment of a method for extracting a message from instant messaging.

FIGS. 11 and 12 show analysis of instant messaging to extract the message, such as analysis for act 501 of FIG. 5. FIG. 11 shows an example instant message stream. The message stream shows two different invitees responding to Mark about a meeting. The meeting is identified by a uniform resource locator (URL) link by Jerry and a meeting identification by Annie. The messages are in response to an invitation. The invitation may have been sent as part of the stream or through a different type of communication.

A plugin or analysis engine monitors the instant messaging to identify any replies to meeting invitations. For example, the analysis engine searches for the meeting using API characteristics, meeting identification, or meeting topic (e.g., title). Keyword searching may be used. Once the content of the instant messaging is associated with the meeting, the message is parsed. For example, any text entered by an invitee in reference to the meeting is parsed. The message is extracted for display to participants and/or the host.

FIG. 12 shows one example flow chart for operation of the plugin, conference server, or host computer for extracting from instant messaging. In act 501, the analysis engine analyzes instant messages received by the host or sent to the host. In acts 502, 503, and 504, the instant message is searched to locate a link, identification, or topic for the meeting. If the search indicates that the message is not associated with the meeting in act 505, the process ends. If associated in act 505, then the message is parsed and composed into a format for the conference server in act 506.

Other types of communication may be monitored. Other acts may be provided. For example, the analysis engine checks for whether the meeting is complete or not. If not complete, then the analysis is performed. If complete, then the analysis is not performed. As another example, the link, topic, or meeting identification check described above for instant messaging is performed for email. In yet another example, the flagging of the invitation and reply described above for email is used in instant messaging.

Figure 13:
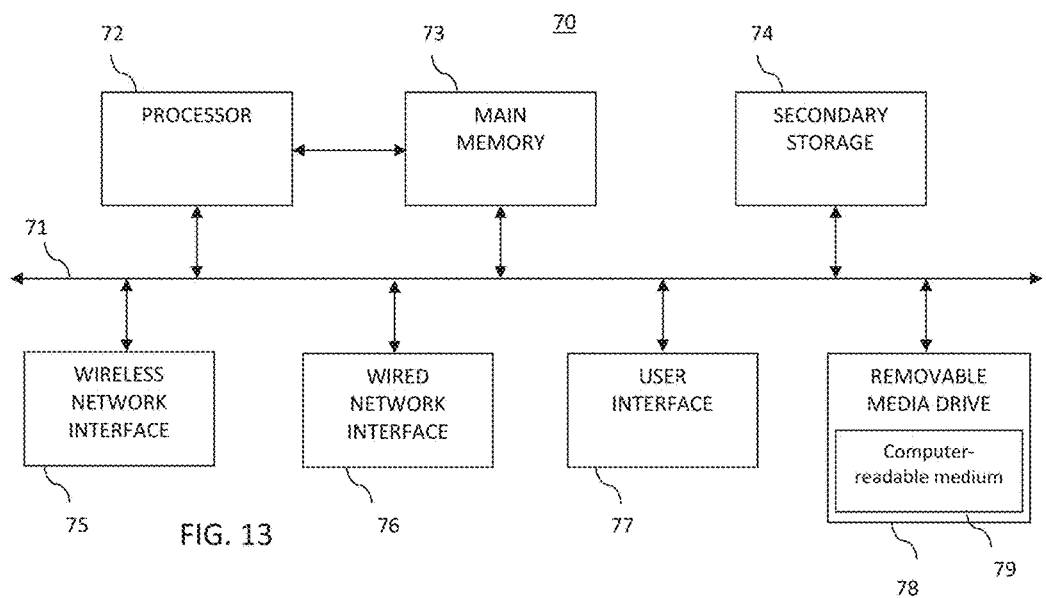
FIG. 13 is a block diagram of an online conferencing device, according to one embodiment, for decline messaging in online conferencing.

FIG. 13 is one embodiment of an apparatus for extracting and/or displaying a message from a declining invitee in online conferencing. The apparatus is shown as a simplified block diagram of an example network device, such as the end-point device 14, 20, 22, or conference server 18 of FIG. 1. In FIG. 13, the example network apparatus or device 70 corresponds to network elements or computing devices that may be deployed in the conferencing network 10. The network device 70 includes software and/or hardware to perform any one or more of the activities or operations for confirming, receiving, displaying, indicating, outputting, extracting, or providing of FIGS. 2 and/or 6.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices. For example, the network device 70 may include another processor and/or not include the secondary storage 74 or removable media drive 78. As another example, the network device 70 connects with a camera and/or microphone. Each network device may include more or less components than other network devices.

The network device 70 is personal computer, tablet, smart phone, server, network processor, or other computer. In one embodiment, the network device 70 is a conferencing server or user computer (e.g., personal computer, laptop, smart phone, tablet, or mobile device) with conferencing capability or software. The network device 70 may be a computer with web browsing software where the web browser displays the conferencing information from a server.

In one embodiment, the network device 70 is part of a conferencing system, such as a telepresence system (from Cisco), WebEx system (from Cisco), or other online conference system. Any device for participating, hosting, and/or controlling online conferencing may be used.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory (e.g., external computer-readable media 79, in main memory 73, in the secondary storage 74, or in the cache memory of processor 72) also one or more lists of invitees and extracted messages.

The wireless and wired network interfaces 75 and 76 may be provided to enable electronic communication between the network device 70 and other network devices via one or more networks. In one example, the wireless network interface 75 includes a wireless network interface controller (WNIC) with suitable transmitting and receiving components, such as transceivers, for wirelessly communicating within the network 10. In another example, the wireless network interface 75 is a cellular communications interface. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

The network interfaces 75 and/or 76 may be configured to receive a list of invited participants in an online conference, receive a message for a declining invitee, or both. For a participant computer, the interfaces 75 and/or 76 receive the list and message from the server of the online conference for display to the participant. For analysis of communications, the interfaces 75 and/or 76 receive communications, such as email, for extracting the message. The interfaces 75 and/or 76 may output communications, extracted messages, and/or lists.

Additionally or alternatively, the network interfaces 75 and/or 76 may be configured to receive audio, video, information and/or shared content for online conferences. Information used for the online conference is provided and/or received.

The processor 72, which may also be a central processing unit (CPU), is any general or special-purpose processor capable of executing machine readable instructions and performing operations on data as instructed by the machine readable instructions. The main memory 73 or other memory may be accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

As a participant computer, the processor 72 is configured by the instructions and/or hardware to display on a display device a list of the invited participants and/or declining participants. For any declining participants, an icon or message may be displayed by the processor 72 adjacent to the name or identifier of the declining participant. The message may be displayed by the processor 72 in response to selection of a message icon or user activation. The message corresponding to text or audio for the invitee declining the invitation is caused to be output by the processor 72. In one embodiment, the output is as part of the user interface for the online conference.

As a conference server or host computer, the processor 72 is configured by the instructions and/or hardware to extract the message from a body in a communication. An email, instant messaging, online conference application entry, or other communications are monitored for being a reply to an invitation. The processor 72 is configured to extract a message from the reply for any invitee declining the invitation. The processor 72 maintains a list of invitees or declining invitees and messages from the declining invites. The list and/or messages are provided by the processor 72 to participant computers for display during the online conference.

A user interface 77 may be provided in none, some or all devices to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for audio), camera, buttons, and/or touch pad. In other embodiments, only the display (e.g., touch screen) is provided.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
receiving responses from invitees of an online conference;
identifying one or more declining invitees who decline to participate in at least a part of the online conference;
extracting from responses of the one or more declining invitees, reasons for declining to attend in at least a part of the online conference;
displaying, by a participant processor on a display device and during an online conference, a list of the invitees of the online conference, the list including the one or more declining invitees, wherein the one or more declining invitees in the list are displayed differently from an attending invitee who attends the online conference;
displaying a first graphical element next to an identification of a declining invitee who provides a first form of response;
displaying a second graphical element, different from the first graphical element, next to an identification of a declining invitee who provides a second form of response different from the first form of response; and
in response to a user selection of one of the first or second graphical element, providing a message having a reason for declining for the declining invitee.

2. The method of claim 1, wherein providing comprises providing the message while the declining invitee is not participating in the online conference.

3. The method of claim 2, wherein providing the message ceases when the declining invitee joins the online conference.

4. The method of claim 1, wherein displaying the list comprises displaying the list with all of the declining invitees as greyed out or in a different color from the attending invitee.

5. The method of claim 1, wherein displaying the list comprises displaying the list as names of the invitees, and wherein the first graphical element or the second graphical element is a message icon adjacent to the name of the declining invitee.

6. The method of claim 1, wherein displaying the first or second graphical element comprises displaying the first or second graphical element next to the identification of the declining invitee while displaying no graphical element next to an identification of the attending invitee.

7. The method of claim 6, wherein providing the message comprises outputting the message as an audio recording from the declining invitee in response to the user selection of the first graphical element.

8. The method of claim 7, wherein providing the message comprises outputting the message as text input by the declining invitee in response to the user selection of the second graphical element.

9. The method of claim 6, wherein the extracting includes parsing information from an email, instant message, or a productivity tool of the online conference.

10. The method of claim 1, wherein providing the message comprises providing the message only after confirmation of permission to provide the message.

11. The method of claim 1, further comprising:
receiving confirmation to attend the online conference from an operator of the participant processor to a host computer; and
receiving the list, including the operator, from an online conference server.

12. Logic encoded in one or more non-transitory computer-readable media that includes code for execution and when executed by a processor is operable to perform operations comprising:
receiving responses from invitees of an online conference;
identifying one or more declining invitees who decline to participate in at least a part of the online conference;
extracting from responses of the one or more declining invitees, reasons for declining to attend the online conference;
displaying, during an online conference, a list of the invitees, the list including the one or more declining invitees, wherein the declining invitees in the list is displayed differently from an attending invitee who attends the online conference;
displaying a first graphical element next to an identification of a declining invitee who provides a first form of response;
displaying a second graphical element, different from the first graphical element, next to an identification of a declining invitee who provides a second form of response different from the first form of response; and
in response to a user selection of one of the first or second graphical element, providing a message indicating a reason for declining to attend.

13. The logic encoded in one or more non-transitory computer-readable media of claim 12, wherein providing comprises providing the message while the declining invitee is not participating in the online conference.

14. The logic encoded in one or more non-transitory computer-readable media of claim 12, wherein receiving the responses comprises receiving an e-mail, wherein extracting comprises parsing a body of a reply of the e-mail as the message, and wherein providing comprises formatting the message for a meeting server.

15. The logic encoded in one or more non-transitory computer-readable media of claim 12, wherein receiving the responses comprises receiving the responses as an entry in an application for the online conference, wherein extracting comprises receiving audio or text entered with the application, and wherein providing comprises formatting the message for a meeting server.

16. The logic encoded in one or more non-transitory computer-readable media of claim 12, wherein receiving the responses comprises receiving an instant message, wherein extracting comprises parsing text of the instant message as the message, and wherein providing comprises formatting the message for a meeting server.

17. The logic encoded in one or more non-transitory computer-readable media of claim 12, wherein displaying the first or second graphical element next to the identification of the declining invitee further comprises displaying no graphical element next to an identification of the attending invitee.

18. An apparatus comprising:
an interface configured to receive responses from invitees of an online conference; and
a processor configured to:
  identify one or more declining invitees who decline to participate in at least a part of the online conference;
  extract from responses of the one or more declining invitees, reasons for declining to attend in at least a part of the online conference;
  during the online conference, display on a display device a list of the invitees, the list including the one or more declining invitees, wherein the one or more declining invitees in the list are displayed differently from an attending invitee who attends the online conference;
  display a first graphical element next to an identification of a declining invitee who provides a first form of response;
  display a second graphical element, different from the first graphical element, next to an identification of a declining invitee who provides a second form of response different from the first form of response; and
  in response to a user selection of one of the first or second graphical element, display a message including a reason for declining to attend the online conference.

19. The apparatus of claim 18, wherein the interface is configured to receive the list and the message from a server of the online conference, and wherein the processor is configured to display the list with all of the declining invitees as greyed out or in a different color from the attending invitee.

20. The apparatus of claim 18, wherein:
the processor is configured to display the first or second graphical element next to the identification of the declining invitee and display no graphical element next to an identification of the attending invitee.

* * * * *